United States Patent
Bonami et al.

(10) Patent No.: US 12,129,330 B2
(45) Date of Patent: Oct. 29, 2024

(54) METHOD FOR REDUCTION OF ALDEHYDE EMISSION IN POLYURETHANE COMPRISING MATERIALS

(71) Applicant: Huntsman International LLC, The Woodlands, TX (US)

(72) Inventors: Lies Bonami, Aalter (BE); Joris Karel Peter Bosman, Herselt (BE); Ingrid Welvaert, Heverlee (BE); Pengfei Wu, Shanghai (CN)

(73) Assignee: HUNTSMAN INTERNATIONAL LLC

( * ) Notice: Subject to any disclaimer, the term of this patent is extended or adjusted under 35 U.S.C. 154(b) by 101 days.

(21) Appl. No.: 16/768,980

(22) PCT Filed: Dec. 18, 2017

(86) PCT No.: PCT/EP2017/083254
§ 371 (c)(1),
(2) Date: Jun. 2, 2020

(87) PCT Pub. No.: WO2019/120469
PCT Pub. Date: Jun. 27, 2019

(65) Prior Publication Data
US 2024/0166793 A1    May 23, 2024

(51) Int. Cl.
*C08G 18/38* (2006.01)
*C08J 9/00* (2006.01)
*C08J 9/228* (2006.01)
*C08K 5/34* (2006.01)
*C08K 5/3432* (2006.01)

(52) U.S. Cl.
CPC ........ *C08G 18/3846* (2013.01); *C08J 9/0028* (2013.01); *C08J 9/228* (2013.01); *C08K 5/3432* (2013.01)

(58) Field of Classification Search
CPC .................. C08G 18/3846; C08K 5/3432
See application file for complete search history.

(56) References Cited

U.S. PATENT DOCUMENTS

| | | |
|---|---|---|
| 2006/0141236 A1 | 6/2006 | Nakamura |
| 2012/0322903 A1* | 12/2012 | Karandikar ............ C08G 18/48 977/773 |
| 2013/0203880 A1 | 8/2013 | George |
| 2016/0304686 A1* | 10/2016 | Otero Martinez . C08G 18/2895 |

FOREIGN PATENT DOCUMENTS

| | | |
|---|---|---|
| DE | 10003157 A1 | 8/2001 |
| DE | 102014215387 A1 | 2/2016 |
| EP | 1428847 | 6/2004 |
| WO | 2013156237 | 10/2013 |
| WO | 2014/026802 | 2/2014 |
| WO | 2016/005479 A1 | 1/2016 |
| WO | 2018/145283 A1 | 8/2018 |

OTHER PUBLICATIONS

International Search Report received in corresponding PCT Application No. PCT/EP2017/083254 mailed Sep. 10, 2018 and completed Aug. 31, 2018.
Written Opinion received in corresponding PCT Application No. PCT/EP2017/083254 mailed Sep. 10, 2018 and completed Aug. 31, 2018.

* cited by examiner

*Primary Examiner* — Michael L Leonard
(74) *Attorney, Agent, or Firm* — Huntsman International LLC; Lewis Craft

(57) ABSTRACT

A reaction mixture and production method for making a polyurethane comprising material having reduced aldehyde emissions.

12 Claims, No Drawings

METHOD FOR REDUCTION OF ALDEHYDE EMISSION IN POLYURETHANE COMPRISING MATERIALS

CROSS-REFERENCE TO RELATED APPLICATIONS

This application is the National Phase of International Application PCT/EP2017/083254 filed Dec. 18, 2017. The noted applications are incorporated herein by reference.

FIELD OF INVENTION

The present invention is related to aldehyde scavengers suitable for use in a formulation for making polyurethane comprising materials such as polyurethane foams.

The present invention is further related to a formulation comprising formaldehyde and/or acetaldehyde scavengers for the reduction of aldehyde emission in polyurethane comprising materials such as polyurethane foams.

The invention is also related to a method for reducing the aldehyde emission in polyurethane comprising materials such as polyurethane foams.

BACKGROUND

This invention relates to polyurethane foams which exhibit decreased aldehyde emissions, a process of making these foams with decreased aldehyde emissions and a method of decreasing aldehyde emissions in polyurethane foams.

From previous studies it is known that both PU foams and the polyether polyols used to produce these foams emit aldehydes when heated in the presence of air. Thus, most polyurethane foams and processes for producing these foams will result in the emission of aldehydes.

The standards and regulations for emissions from polyurethane foam have become more stringent, especially within the automotive industry. The requirements within the automotive industry only allow very low emissions or almost no emissions of aldehydes, such as formaldehyde and acetaldehyde from these polyurethane foams. A test method has been developed, namely the VDA 276 test method. Some automotive OEM's specify stringent formaldehyde and acetaldehyde emissions.

Various attempts have been made to integrate so-called aldehyde scavengers in the polyurethane foam. As an example DE10003157A1 discloses polymeric polyethylene imines being dissolved in a solvent, after which the solution is sucked into the foam structure. After drying or evaporation of the solvent, the polymeric molecules remain in the foam structure and act as aldehyde scavengers. This process is cost and labor intensive, a significant amount of scavenging polymer is needed and the polymers are not necessarily all bonded to the chemical polyurethane or polyurea structure.

Patent application WO2014/026802 describes a foam where the emission of formaldehyde is decreased, when using the VDA 276 test and where the foam was made using a composition comprising an amine component. Also WO2016/005479 describes compositions that can be used for making polyurethanes which are able to reduce formaldehyde and acetaldehyde emissions. Patent application US2016/0304686 describes compounds that are able to reduce the emission of formaldehyde.

US20060141236 describes polyurethane moulded articles having reduced aldehyde emissions and a method for making said articles thereby adding a hydrazine compound as an aldehyde scavenger to the polyol component.

EP1428847 discloses a process for reducing emissions from polyurethane foam by adding polymers having primary and secondary amine groups.

US20130203880 describes polyurethane foams with decreased aldehyde emission by adding 0.5 to 8 parts trimerized hexamethylene diisocyanate to the isocyanate component.

WO2013156237 describes aldehyde scavenger compounds having guanidine groups and use as additive in the production of PU systems.

Any manufacturer that can make and/or sell polyurethane foams that can pass the stringent emission requirements, particularly with respect to aldehyde emissions, has a significant competitive advantage over their competitors. New ways of further reducing aldehyde emissions and lowering the exposure of end-users and customers to these emissions are highly desirable in the industry.

GOAL OF THE INVENTION

It is the goal of the invention to reduce the emission of aldehydes, more in particular formaldehyde and/or acetaldehyde emissions in polyurethane foams.

The goal is to develop a reaction mixture for making polyurethane comprising materials such as polyurethane foams wherein said reaction mixture comprises aldehyde scavenger compounds.

It is a further goal to make polyurethane comprising materials such as polyurethane foams which have significant reduced emission of aldehydes and wherein the mechanical properties of the resulting foam (such as compression set and ageing behaviour under humid conditions) are not adversely affected.

Surprisingly we have found efficient aldehyde scavenger compounds which can be added to the reaction mixture for making polyurethane comprising materials such as polyurethane foams and which are effective in low concentrations.

SUMMARY OF THE INVENTION

According to a first aspect of the invention, a reaction mixture for making a polyurethane material is disclosed, said mixture comprising at least one isocyanate reactive compound, at least one polyisocyanate compound and at least one aldehyde reducing (scavenger) compound of the general formula [I]:

$$R_1-NH-R_2 \qquad [I]$$

Wherein
R$_1$ and R$_2$ are independently of one another selected from —SO$_2$R$_4$, —C(O)R$_5$, a pyridyl derivative, —CH=CHR$_3$ or —CN,
R$_3$ is —SO$_2$R$_4$, —C(O)R$_5$, a pyridyl derivative or —CN
R$_4$ is NH$_2$, NHR$_6$, NR$_7$R$_8$, OR$_9$ or R$_{10}$
R$_5$ is H, NH$_2$, NHR$_6$, NR$_7$R$_8$, OR$_9$ or R$_{10}$
R$_6$, R$_7$, R$_8$, R$_9$, or R$_{10}$ are independently of one another selected from a combination of linear, branched, saturated, unsaturated, cyclic and/or non-cyclic aliphatic hydrocarbons, araliphatic hydrocarbons, aromatic hydrocarbons and mixtures thereof, optionally comprising substituents selected from hydroxy, ether, halogen, carboxyl, isocyanate, nitro and/or amine groups, R$_1$ and R$_2$ may be linked to each other essentially forming a ring structure According to embodiments, the aldehyde scavenger compound is a formaldehyde and/or acetaldehyde scavenger compound.

According to embodiments, R$_1$ and R$_2$ in the aldehyde scavenger compound of the formula R$_1$—NH—R$_2$ form together with the —NH— group a 5 to 12 membered ring structure and comprise unsaturations, aromatic rings and/or heteroatoms.

According to embodiments, the pyridyl derivative in the aldehyde scavenger compound according to the invention is bound on the 2, 3, 4 or 5 position to the NH of the R$_1$—NH—R$_2$ formula and the pyridyl derivative is substituted with an aliphatic hydrocarbon, an araliphatic hydrocarbon and/or an aromatic hydrocarbon.

According to embodiments, the moieties R$_6$, R$_7$, R$_8$, R$_9$, or R$_{10}$ in the aldehyde scavenger compound according to the invention are independently of one another selected from a combination of linear, branched, saturated, unsaturated, cyclic and/or non-cyclic aliphatic hydrocarbons, araliphatic hydrocarbons, aromatic hydrocarbons having 1 to 15, preferably 2 to 10, carbon atoms which may have substituents and mixtures thereof.

According to embodiments, the substituents in the aldehyde scavenger compound according to the invention are selected from one or more isocyanate-reactive groups, which advantageously comprise isocyanate-reactive hydrogen atoms selected from the group of —OH, —NH— or —NH$_2$ groups.

According to embodiments, the aldehyde scavenger compound has a molecular weight of at most 3000 g/mol, preferably below 1500 g/mol, more preferably below 500 g/mol.

According to embodiments, the reaction mixture according to the invention further comprising one or more surfactants, one or more flame retardants, water, one or more antioxidants, one or more auxiliary blowing agents, one or more urethane catalysts, or combinations thereof.

According to embodiments, the amount of the aldehyde scavenger compound in the reaction mixture according to the invention is between 0.01 to 5 pbw, preferably from 0.05 pbw to 2 pbw, more preferably between 0.05 pbw and 1 pbw calculated on the total weight of the reaction mixture.

According to embodiments, the isocyanate reactive compound in the reaction mixture according to the invention is selected from a polyether polyol, a polyester polyol, a polyether polyamine and/or a polyester polyamine.

According to a second aspect of the invention, a method for reducing the emission of aldehydes from a polyurethane comprising material is disclosed, the method comprising mixing the compounds of the reaction mixture according to the present invention.

According to a third aspect of the invention, a method for the production of a polyurethane comprising material having reduced aldehyde emissions is disclosed, the method comprising mixing the compounds of the reaction mixture according to the present invention to obtain a foam.

According to embodiments, the obtained polyurethane comprising material made using the method of the invention is a polyurethane comprising foam material having low formaldehyde emissions.

According to a further aspect, the use of the reaction mixture according to the invention for the manufacture of a polyurethane comprising foam in furniture and/or automotive applications is disclosed.

The independent and dependent claims set out particular and preferred features of the invention. Features from the dependent claims may be combined with features of the independent or other dependent claims as appropriate.

DEFINITIONS AND TERMS

In the context of the present invention the following terms have the following meaning:
1) The word "average" refers to number average unless indicated otherwise.
2) "Isocyanate compound" is meant to denote mono-isocyanate compounds, polyisocyanate compounds (having two or more NCO groups), NCO-terminated biuret, isocyanurates, carbamates and NCO-terminated prepolymers. The term "mono-isocyanate compound" is meant to denote isocyanate compounds having one isocyanate group. The term "polyisocyanate compound" is meant to denote isocyanate compounds having at least two isocyanate groups. The term "diisocyanate compound" is meant to denote polyisocyanate compounds having two isocyanate groups.
3) The "isocyanate index" or NCO index or index is the ratio of NCO-groups over isocyanate-reactive hydrogen atoms present in a formulation, given as a percentage:

$$\frac{[NCO] \times 100}{[\text{active hydrogen}]}(\%)$$

In other words the NCO-index expresses the percentage of isocyanate actually used in a formulation with respect to the amount of isocyanate theoretically required for reacting with the amount of isocyanate-reactive hydrogen used in a formulation.
4) The term "isocyanate reactive compound" or "polyisocyanate reactive compound" as used herein includes any component with a "isocyanate reactive group(s)" or "isocyanate reactive moiety or moieties". The term "isocyanate reactive group" as use herein includes any group or moiety containing an active hydrogen group or moiety. For the purposes of this disclosure, an active hydrogen containing group refers to a group containing a hydrogen atom which, because of its position in the molecule, displays significant activity according to the Zerewitnoff test described by Wohler in the Journal of the American Chemical Society, Vol. 49, page 3181 (1927). Illustrative of such active hydrogen groups are —OH, —NH$_2$, and —NH.
5) According to this invention "aldehyde scavenger compounds" and "aldehyde reducing compounds" refers to compounds capable of reducing the emission of aldehyde in polyurea or polyurethane materials, and modified polyurethanes compared to polyurea or polyurethane materials, and modified polyurethanes made of a composition not comprising the aldehyde scavenger compound.
6) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
7) "Liquid" means having a viscosity of less than 10 Pa·s measured according to ASTM D445-11a at 20° C.
8) Unless otherwise expressed, the "weight percentage" (% wt) of a component in a composition refers to the weight of the component over the total weight of the composition in which it is present, and is expressed as percentage.
9) Unless otherwise expressed, "parts by weight" (pbw) of a component in a composition refers to the weight of the component over the total weight of the composition in which it is present, and is expressed as pbw.
10) Unless otherwise specified, "VOC" refers to Volatile Organic Compound. The VDA 276 test method (also called VOC chamber test) is an emission measurement method to measure the emissions from a foam sample placed in a 1 m³ chamber where the foam is exposed to 65° C. and 5% RH (relative humidity) for several hours. VDA 276 (Verband Der Automobil industrie) is a specific automotive emission method used by a host of automotive OEM's (original equipment manufacturers) to specify the permissible emission levels coming from automotive interior parts.

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

The present invention relates to aldehyde scavenger compounds, a reaction mixture comprising said aldehyde scavenger compounds for making polyurethane materials, preferably polyurethane foam materials with reduced aldehyde emissions (more in particular formaldehyde and/or acetaldehyde emissions) and a process for making polyurethane materials with reduced aldehyde emissions.

The aldehyde scavenger compounds according to the invention are selected from one or more compounds corresponding to the general formula [I]:

[I]

Wherein
$R_1$ and $R_2$ are independently of one another selected from —$SO_2R_4$, —C(O)$R_5$, a pyridyl derivative, —CH=CH$R_3$ or —CN,
$R_3$ is —$SO_2R_4$, —C(O)$R_5$, a pyridyl derivative or —CN
$R_4$ is $NH_2$, $NHR_6$, $NR_7R_8$, $OR_9$ or $R_{10}$
$R_5$ is H, $NH_2$, $NHR_6$, $NR_7R_8$, $OR_9$ or $R_{10}$
$R_6$, $R_7$, $R_8$, $R_9$, or $R_{10}$ are independently of one another selected from a combination of linear, branched, saturated, unsaturated, cyclic and/or non-cyclic aliphatic hydrocarbons, araliphatic hydrocarbons, aromatic hydrocarbons and mixtures thereof, optionally comprising substituents selected from hydroxy, ether, halogen, carboxyl, isocyanate, nitro and/or amine groups,
$R_1$ and $R_2$ may be linked to each other essentially forming a ring structure Preferably the aldehyde scavenger compound according to the present invention are formaldehyde and/or acetaldehyde scavenger compounds. Most preferably the aldehyde scavenger compound of the present invention is a formaldehyde scavenger compound.

The pyridyl derivative according to the invention may be bound on the 2, 3, 4 or 5 position to the NH of the $R_1$—NH—$R_2$ formula. The pyridyl derivative may be substituted e.g. with aliphatic hydrocarbon, araliphatic hydrocarbon or aromatic hydrocarbon, which can also be substituted.

In one embodiment, the moieties $R_6$, $R_7$, $R_8$, $R_9$, or $R_{10}$ are independently of one another selected from a combination of linear, branched, saturated, unsaturated, cyclic and/or non-cyclic aliphatic hydrocarbons, araliphatic hydrocarbons, aromatic hydrocarbons having 1 to 15, preferably 2 to 10, carbon atoms, which may have substitution and mixtures thereof. Substituents may be selected from one or more isocyanate-reactive groups, which advantageously comprise isocyanate-reactive hydrogen atoms. Groups of this kind that are isocyanate-reactive may be, for example, —OH, —NH— or —$NH_2$ groups. Particularly preferred as isocyanate-reactive groups are one or more OH groups, more particularly an OH group.

Preferably the aldehyde scavenger compounds according to the invention have a molecular weight of at most 3000, preferably the molecular weight of the aldehyde scavenger compound is below 1500, more preferably <500.

In case $R_1$ and $R_2$ are linked to each other such that a ring structure is formed in the compound $R_1$—NH—$R_2$ then $R_1$ and $R_2$ together with the —NH— group may form a 5 to 14 membered ring structure. Such compounds are beneficial and preferred. Examples of said compounds having a ring structure are:

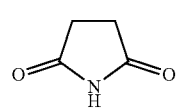

Pyrrolidine-2,5-dione (succinimide)

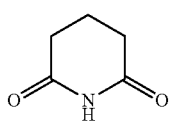

Piperidine-2,6-dione (glutarimide)

(3)

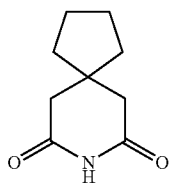

8-azaspiro[4.5]decane-7,9-dione
(Tetramethylene glutarimide)

The ring structure may comprise 1 or more unsaturations and/or optionally 1 or more aromatic rings and/or optionally rings with heteroatomes.

$R_1$—NH—$R_2$ compounds wherein $R_1$ and $R_2$ together with the —NH— group may form a 5 to 12 membered ring structure and further comprise unsaturations, aromatic rings and/or heteroatoms. Examples of said $R_1$—NH—$R_2$ compounds wherein $R_1$ and $R_2$ together with the —NH— group may form a 5 to 12 membered ring structure and comprise unsaturations, aromatic rings and/or heteroatomes are given below.

(4)

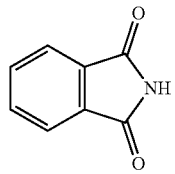

Iso indoline-1,3-dione
(Phthalimide)

(5)

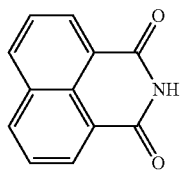

1H-benzo[de]isoquinoline-1,3(2H)-dione
(Naphtalimide)

(6)

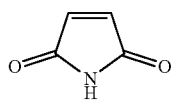

2,5 pyrrole dione
(Maleimide)

(7)

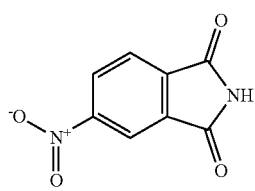

5-nitro isoindoline-1,3-dione
(4 nitro phthalimide)

(8)

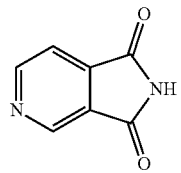

1H-pyrrolo[3,4-c]pyridine-1,3(2H)-dione
(3,4 pyridine dicarboxamide)

(9)

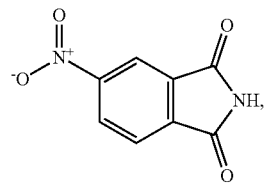

5-nitroisoindoline-1,3-dione (10)

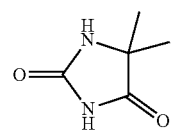

5,5-dimethylimidazolidine-2,4-dione (11)

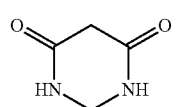

pyrimidine-2,4,6(1H, 3H, 5H)-trione (12)

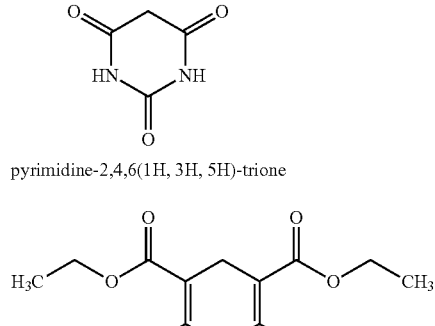

Diethyl 1,4-dihydro-2,6-dimethyl-3,5-pyridinedicarboxylate

Further examples of suitable compounds wherein $R_1$ and/or $R_2$ comprise a ring structure are following compounds:

(13)

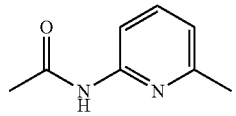

N-(6-methylpyridin-2-yl)acetamide (14)

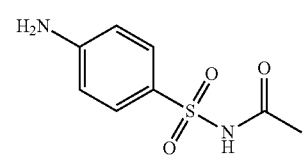

N-((4-aminophenyl)sulfonyl)acetamide

Further, the inventors found that some of the aldehyde scavenger compounds according to formula [I] may be easily soluble in a polyisocyanate composition and/or in an isocyanate reactive composition.

The present invention further discloses a reaction mixture for making a polyurethane material, said mixture comprising at least one isocyanate reactive compound, at least one polyisocyanate compound and at least one aldehyde scavenger compound of the general formula [I]:

$$R_1—NH—R_2 \quad [I]$$

Wherein
- $R_1$ and $R_2$ are independently of one another selected from —$SO_2R_4$, —$C(O)R_5$, a pyridyl derivative, —CH=$CHR_3$ or —CN,
- $R_3$ is —$SO_2R_4$, —$C(O)R_5$, a pyridyl derivative or —CN
- $R_4$ is $NH_2$, $NHR_6$, $NR_7R_8$, $OR_9$ or $R_{10}$
- $R_5$ is H, $NH_2$, $NHR_6$, $NR_7R_8$, $OR_9$ or $R_{10}$
- $R_6$, $R_7$, $R_8$, $R_9$, or $R_{10}$ are independently of one another selected from a combination of linear, branched, saturated, unsaturated, cyclic and/or non-cyclic aliphatic hydrocarbons, araliphatic hydrocarbons, aromatic hydrocarbons and mixtures thereof, optionally comprising substituents selected from hydroxy, ether, halogen, carboxyl, isocyanate, nitro and/or amine groups,
- $R_1$ and $R_2$ may be linked to each other essentially forming a ring structure And wherein the aldehyde scavenger compounds should be present in the reaction mixture in an effective amount suitable for reducing the aldehyde emission.

According to embodiments, the reaction mixture according to the invention further comprises at least a catalyst selected from blowing and/or gelling catalysts, and optionally fire retardants, antioxidants, surfactants, physical or chemical blowing agents, fillers, pigments, or any other typical additives used in polyurethane materials. These compounds are very well known in the art and can be used at any known and practically used concentration.

Using the reaction mixture according to the invention will give rise to production of polyurethane materials, preferably polyurethane foam materials with a low level of aldehyde emissions, such as the formaldehyde, preferably to a level of less than 100 μg/m³, more preferably ≤80 μg/m³ for 1 kg foam when tested with the VDA 276 test method.

The at least one polyisocyanate compound in the reaction mixture of the invention may comprise any of the polyisocyanates known for the production of polyurethanes. These comprise the aliphatic, cycloaliphatic, and aromatic difunctional or polyfunctional isocyanates known from the prior art, and also any desired mixtures thereof. Examples are diphenylmethane 2,2'-, 2,4'-, and 4,4'-diisocyanate, the mixtures of monomeric diphenylmethane diisocyanates with diphenylmethane diisocyanate homologs having a larger number of rings (polymer MDI), isophorone diisocyanate (IPDI) and its oligomers, tolylene 2,4- and 2,6-diisocyanate (TDI), and mixtures of these, tetramethylene diisocyanate and its oligomers, hexamethylene diisocyanate (HDI) and its oligomers, naphthylene diisocyanate (NDI), and mixtures thereof. It is preferably to use tolylene 2,4- and/or 2,6-diisocynate (TDI) or a mixture thereof, monomeric diphenylmethane diisocyanates, and/or diphenylmethane diisocyanate homologs having a larger number of rings (polymer MDI), and mixtures of these. The polyisocyanate compound used can also take the form of a polyisocyanate prepolymer. The polyisocyanate compound, according to this invention may comprise any number of polyisocyanates, including but not limited to, toluene diisocyanates (TDI), diphenylmethane diisocyanate (MDI) type isocyanates, and prepolymers of these isocyanates. Semi-prepolymers and prepolymers which may be obtained by reacting polyisocyanates with compounds containing isocyanate-reactive hydrogen atoms are also considered polyisocyanate compounds here. Examples of compounds containing isocyanate-reactive hydrogen atoms include alcohols, glycols or even relatively high molecular weight polyether polyols and polyester polyols, mercaptans, carboxylic acids, amines, urea and amides. Examples of suitable prepolymers are reaction products of polyisocyanates with monohydric or polyhydric alcohols.

Polyisocyanate prepolymers may be prepared by conventional methods, e.g. by reacting polyhydroxyl compounds which have a molecular weight of from 400 to 8000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

The at least one isocyanate reactive compound in the reaction mixture of the invention may comprise any isocyanate reactive compound selected from the group consisting of a polyether polyol, a polyester polyol, a polyether polyamine, a polyester polyamine, and/or a monool having an average molecular weight of 32-8000 and an average nominal functionality of 1-8.

Examples of suitable polyether polyols are polyethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000, polyester polyols having an average molecular weight of 200-8000, polyether polyester polyols having an average molecular weight of 200-8000 and polyether polyols having an average molecular weight of 200-8000. Preferably the polyether polyols are based on propylene oxide and/or ethylene oxide.

Examples of polyols are Daltocel® F555, Daltocel® F428, Daltocel® F489 and Daltocel® F442, which are all polyether triols from Huntsman.

The invention further relates to a process for making polyurethane comprising materials. Said process comprising combining and mixing at least following compounds to form a reaction mixture:
- at least one isocyanate compound;
- at least one isocyanate reactive compound; and
- at least one aldehyde scavenger selected from compounds corresponding to the formula [I]

$$R_1—NH—R_2 \quad [I]$$

Wherein
- $R_1$ and $R_2$ are independently of one another selected from —$SO_2R_4$, —$C(O)R_5$, a pyridyl derivative, —CH=$CHR_3$ or —CN,
- $R_3$ is —$SO_2R_4$, —$C(O)R_5$, a pyridyl derivative or —CN
- $R_4$ is $NH_2$, $NHR_6$, $NR_7R_8$, $OR_9$ or $R_{10}$
- $R_5$ is H, $NH_2$, $NHR_6$, $NR_7R_8$, $OR_9$ or $R_{10}$
- $R_6$, $R_7$, $R_8$, $R_9$, or $R_{10}$ are independently of one another selected from a combination of linear, branched, saturated, unsaturated, cyclic and/or non-cyclic aliphatic hydrocarbons, araliphatic hydrocarbons, aromatic hydrocarbons and mixtures thereof, optionally comprising substituents selected from hydroxy, ether, halogen, carboxyl, isocyanate, nitro and/or amine groups, $R_1$ and $R_2$ may be linked to each other essentially forming a ring structure According to a preferred embodiment, the polyurethane comprising material is a polyurethane foam and the reaction mixture comprises at least one blowing agent which may be selected from water and/or blowing agents such as $CO_2$ and fluor based hydrocarbon compounds (hydrofluorcarbon compounds).

According to embodiments, the process for making the polyurethane comprising materials further comprises adding to the reaction mixture at least one catalyst selected from blowing and/or gelling catalysts, and optionally fire retardants, antioxidants, surfactants, physical or chemical blowing agents, fillers, pigments, or any other typical additives used in polyurethane materials. These compounds are very well known in the art and can be used at any known and practically used concentration.

According to embodiments, the amount of the aldehyde scavenger compound is from 0.01 pbw to 5 pbw, preferably from 0.05 pbw to 2 pbw, even more preferably between 0.05 pbw and 1 pbw calculated on the total weight of the reaction mixture. The amount can vary depending on the type of polyurethane that is made and the isocyanate compound and the isocyanate reactive compound that is used. Preferably the amount of the aldehyde scavenger compound is an effective amount that is able to reduce the emission of aldehydes, more in particular to reduce the emission of formaldehyde and/or acetaldehyde significantly.

According to embodiments, the process for making a polyurethane material (foam) thereby using the aldehyde scavenger compound according to the present invention is performed by combining the ingredients of the reaction mixture and this may be performed in various ways selected from step-wise, continuous or semi-continuous. The at least one aldehyde scavenger compound can first be blend with the polyisocyanate compound or can first be blend with the isocyanate reactive compound, before it is mixed with the other compounds or alternatively be added as a separate stream and then used to make polyurethane foam.

Further, the invention is related to a method for reducing the emission of aldehydes, more in particular formaldehyde and/or acetaldehyde from a polyurethane or polyurea material (foam), the method comprising mixing the compounds of the above described reaction mixture.

The present invention further relates to polyurethane materials, more in particular polyurethane foam materials made using the process according to the invention and making use of the aldehyde scavenger compounds according to the present invention and the use of said materials. The polyurethane materials comprise polyisocyanate polyaddition products, for example thermosets, and foams based on polyisocyanate polyaddition products, for example flexible foams, semi rigid foams, rigid foams, and integral foams and also polyurethane coatings and binders.

According to embodiments, the polyurethane foam according to the invention is a flexible or semi-rigid foam and the NCO index of the reaction mixture used for making said foam is in the range of from about 80 to about 150, preferably from about 90 to about 130.

According to embodiments, the polyurethane foam according to the invention is a rigid foam and the NCO index of the foam composition is in the range of from about 105 to about 1000, preferably from about 105 to about 400.

The polyurethane material (foam) of the invention is preferably used in furniture and/or automotive applications.

The invention is now illustrated with below reference to the examples.

EXAMPLES

Chemicals used:

Suprasec® 2447 polyisocyanate compound obtained from Huntsman

Daltocel® F428, polyol obtained from Huntsman

Jeffcat® ZE10, blowing catalyst available from Huntsman

Jeffcat® DPA, gelling catalyst obtained from Huntsman

Diethanolamine, chain extender obtained from Huntsman

Tegostab® B8734LF2, surfactant available from Evonik

Suprasec®, Jeffcat® and Daltocel® are trademarks of the Huntsman Corporation or an Affiliate thereof and have been registered in one or more but not all countries.

The following examples show reaction mixture for making PU foam materials according to the invention and comparative examples using reaction mixture for making PU foam materials without aldehyde scavengers and the emission results obtained on the PU foam using the VDA-276 test.

Example 1

Table 1 shows the compositions of reaction mixtures for making a polyurethane foam and the formaldehyde emissions measured on the obtained foams. Example 1 is according to the invention using a reaction mixture whereto succinimide was added (all ingredients expressed in gram). The comparative example (comp1) is using a reaction mixture whereto no aldehyde scavenger is added.

TABLE 1

Composition of reaction mixtures used to make PU foams and result of the formaldehyde emission.

|  | Comp 1 | Example 1 |
| --- | --- | --- |
| Daltocel ® F428 | 100 | 100 |
| Water | 4 | 4 |
| Jeffcat ® ZF10 | 0.1 | 0.1 |
| Jeffcat ® DPA | 1 | 1 |
| Diethanolamine | 0.3 | 0.3 |
| Tegostab ® B8734LF2 | 0.9 | 0.9 |
| Succinimide [2] | — | 0.3 |
| Suprasec ® S2447 | 60 | 60 |
| VDA 276 formaldehyde emissions, µg/m3 · kg foam | 144 | 51 |

[2] compound first added to the isoreactive (polyol) blend.

Examples 2-3

Table 2 shows the compositions of reaction mixtures for making a polyurethane foam and the formaldehyde emissions measured on the obtained foams. Examples 2-3 are according to the invention using a reaction mixture whereto phtalamide or saccharin was added (all ingredients expressed in gram). The comparative example (comp2) is using a reaction mixture whereto no aldehyde scavenger is added.

TABLE 2

Composition of reaction mixtures used to make PU foams and result of the formaldehyde emission.

|  | Comp 2 | Example 2 | Example 3 |
|---|---|---|---|
| Daltocel ® F428 | 100 | 100 | 100 |
| Water | 4 | 4 | 4 |
| Jeffcat ® ZF10 | 0.1 | 0.1 | 0.1 |
| Jeffcat ® DPA | 1 | 1 | 1 |
| Diethanolamine | 0.3 | 0.3 | 0.3 |
| Tegostab ® B8734LF2 | 0.9 | 0.9 | 0.9 |
| Phtalamide (2) | — | 0.3 | — |
| Saccharin (2) | — | — | 0.3 |
| Suprasec ® S2447 | 60 | 60 | 60 |
| VDA 276 formaldehyde emissions, μg/m3 · kg foam | 114 | 59 | 80 |

(2) compound first added to the isoreactive (polyol) blend.

Examples 4-9

Table 2 shows the compositions of reaction mixtures for making a polyurethane foam and the formaldehyde emissions measured on the obtained foams. Examples 4-9 are according to the invention using a reaction mixture whereto 5-nitroisoindoline-1,3-dione, 5,5-dimethylimidazolidine-2,4-dione, N-(6-methylpyridin-2-yl)acetamide, pyrimidine-2,4,6(1H, 3H, 5H)-trione or N-((4-aminophenyl)sulfonyl)acetamide was added as aldehyde scavenger compound (all ingredients expressed in gram). The comparative example (comp3) is using a reaction mixture whereto no aldehyde scavenger is added. The formaldehyde emissions were measured with an alternative measurement method instead of using the VDA 276. A microscale chamber analysis was performed at 65 C for 3 hours using air flow rate of 40 ml/min on a foam sample weight of 0.7500 gram (gas regulator 14 psi). typically higher emissions values are measured compared to the VDA 276 test.

TABLE 3

Composition of reaction mixtures used to make PU foams and result of the formaldehyde emission.

|  | Comp 3 | Example 4 | Example 5 | Example 6 | Example 7 | Example 8 | Example 9 |
|---|---|---|---|---|---|---|---|
| Daltocel F428 | 100 | 100 | 100 | 100 | 100 | 100 | 100 |
| Water | 4 | 4 | 4 | 4 | 4 | 4 | 4 |
| Jeffcat ZF10 | 0.1 | 0.1 | 0.1 | 0.1 | 0.1 | 0.1 | 0.1 |
| Jeffcat DPA | 1 | 1 | 1 | 1 | 1 | 1 | 1 |
| Diethanolamine | 0.3 | 0.3 | 0.3 | 0.3 | 0.3 | 0.3 | 0.3 |
| Tegostab B8734LF2 | 0.9 | 0.9 | 0.9 | 0.9 | 0.9 | 0.9 | 0.9 |
| 5-nitroisoindoline-1,3-dione (2) | — | 0.3 | — | — | — | — | — |
| 5,5-dimethylimidazolidine-2,4-dione (2), | — | — | 0.3 | — | — | — | — |
| N-(6-methylpyridin-2-yl)acetamide (2) | — | — | — | 0.3 | — | — | — |
| N-(6-methylpyridin-2-yl)acetamide (3) | — | — | — | — | 0.3 | — | — |
| pyrimidine-2,4,6(1H,3H,5H)-trione (2) | — | — | — | — | — | 0.3 | — |
| N-((4-aminophenyl)sulfonyl)acetamide (2) | — | — | — | — | — | — | 0.3 |
| Suprasec S2447 | 60 | 60 | 60 | 60 | 60 | 60 | 60 |
| Micro-scale chamber analysis at 65° C. | 402 | 76 | 189 | 334 | 330 | 10 | 208 |

(2) compound first added to the isoreactive (polyol) blend.
(3) compound first added to the isocyanate blend.

The invention claimed is:

1. A reaction mixture for making a polyurethane material, said mixture comprising at least one isocyanate reactive compound, at least one polyisocyanate compound and at least one aldehyde scavenger compound of the general formula [I]:

$$R_1—NH—R_2 \quad [I]$$

wherein
$R_1$ and $R_2$ are independently of one another selected from —$SO_2R_4$, —C(O)$R_5$, a pyridyl derivative, —CH=CH$R_3$ or —CN,
$R_3$ is —$SO_2R_4$, —C(O)$R_5$, a pyridyl derivative or —CN,
$R_4$ is $NH_2$, $NHR_6$, $NR_7R_8$, $OR_9$ or $R_{10}$
$R_5$ is H, $NH_2$, $NHR_6$, $NR_7R_8$, $OR_9$ or $R_{10}$
$R_6$, $R_7$, $R_8$, $R_9$, or $R_{10}$ are independently of one another selected from a combination of linear, branched, saturated, unsaturated, cyclic and/or non-cyclic aliphatic hydrocarbons, araliphatic hydrocarbons, aromatic hydrocarbons and mixtures thereof, optionally comprising substituents selected from hydroxy, ether, halogen, carboxyl, isocyanate, nitro and/or amine groups,
$R_1$ and $R_2$ may be linked to each other essentially forming a ring structure; and
wherein the pyridyl derivative is bound on the 2, 3, 4 or 5 position to the NH of the R1-NH—R2 formula and the pyridyl derivative is substituted with an aliphatic hydrocarbon, an araliphatic hydrocarbon and/or an aromatic hydrocarbon.

2. The reaction mixture according to claim 1, wherein the aldehyde scavenger compound is a formaldehyde and/or acetaldehyde scavenger compound.

3. The reaction mixture according to claim 1, wherein $R_1$ and $R_2$ together with the —NH— group form a 5 to 12 membered ring structure and optionally comprise unsaturations, aromatic rings and/or heteroatoms.

4. The reaction mixture according to claim 1, wherein the moieties $R_6$, $R_7$, $R_8$, $R_9$, or $R_{10}$ are independently of one another selected from a combination of linear, branched, saturated, unsaturated, cyclic and/or non-cyclic aliphatic hydrocarbons, araliphatic hydrocarbons, aromatic hydrocarbons having 1 to 15, carbon atoms which may have substituents and mixtures thereof.

5. The reaction mixture according to claim 1, wherein the substituents are selected from one or more isocyanate-reactive groups.

6. The reaction mixture according to claim 1, wherein the aldehyde scavenger compound has a molecular weight of at most 3000 g/mol.

7. The reaction mixture according to claim 1, further comprising one or more surfactants, one or more flame retardants, water, one or more antioxidants, one or more auxiliary blowing agents, one or more urethane catalysts, or combinations thereof.

8. The reaction mixture according to claim 1, wherein the amount of the aldehyde scavenger compound is between 0.01 to 5 pbw calculated on the total weight of the reaction mixture.

9. The reaction mixture according to claim 1, wherein the isocyanate reactive compound is selected from a polyether polyol, a polyester polyol, a polyether polyamine and/or a polyester polyamine.

10. A method for reducing the emission of aldehydes from a polyurethane comprising material, the method comprising mixing the compounds according to claim 1.

11. A method for the production of a polyurethane comprising material having reduced aldehyde emissions, the method comprising mixing the compounds according to claim 1 to obtain a foam.

12. The method according to claim 11, wherein the obtained polyurethane comprising material is a polyurethane comprising foam material having low formaldehyde emissions.

\* \* \* \* \*